United States Patent [19]

Ovshinsky et al.

[11] 4,339,255
[45] Jul. 13, 1982

[54] METHOD AND APPARATUS FOR MAKING A MODIFIED AMORPHOUS GLASS MATERIAL

[75] Inventors: Stanford R. Ovshinsky, Bloomfield Hills; Richard A. Flasck, Rochester, both of Mich.

[73] Assignee: Energy Conversion Devices, Inc., Troy, Mich.

[21] Appl. No.: 185,528

[22] Filed: Sep. 9, 1980

[51] Int. Cl.³ .................... C03B 7/00; C03B 19/00; C03C 3/30
[52] U.S. Cl. ........................... 65/32; 65/66; 65/83; 65/121; 65/137; 65/145; 65/157; 148/179; 148/188; 357/2
[58] Field of Search .............. 65/32, 66, 83, 121, 65/137, 145, 157; 501/42, 53, 54, 64, 73, 78; 357/2, 4, 61; 136/258; 148/1.5, 179, 188

[56] References Cited

U.S. PATENT DOCUMENTS

| | | | |
|---|---|---|---|
| 4,177,473 | 12/1979 | Ovshinsky | 357/2 |
| 4,177,474 | 12/1979 | Ovshinsky | 357/2 |
| 4,178,415 | 12/1979 | Ovshinsky et al. | 357/2 X |
| 4,217,374 | 8/1980 | Ovshinsky et al. | 357/2 X |
| 4,226,898 | 10/1980 | Ovshinsky et al. | 357/2 X |

OTHER PUBLICATIONS

Chaudhari et al., "Metallic Glasses", Scientific American, Apr. 1980, vol. 242, No. 4, pp. 98–100, 102, 104–106, 108–110, 112, 114, 115.
Gilman, "Metallic Glasses", Science, May 1980, vol. 208, pp. 856–861.
Anthony et al., "On the Uniformity of Amorphous Metal Ribbon . . . ", J. Appl. Phys., Feb. 1978, vol. 49, No. 2, pp. 829–837.

Primary Examiner—Richard V. Fisher
Attorney, Agent, or Firm—Lawrence G. Norris

[57] ABSTRACT

The method for forming a metallic, dielectric or semiconductor modified amorphous glass material includes the steps of forming a fluid host matrix material on a substrate surface having relative movement thereto, such as a wheel; directing a fluid modifier material in a stream, as from a nozzle toward the substrate surface in a direction such that it converges with the host matrix material; maintaining the temperature of the substrate or wheel between 4.2° K and ambient room temperature while rotating the wheel at a velocity of 1000 to 5000 rpm to obtain a surface velocity of between 1000 to 4000 centimeters per second thereby to obtain rapid quenching of the host and modifier materials as they contact one another at a rate of from $10^4$ to at least $10^8$ C per second or more to produce a ribbon of modified amorphous glass material in which the electrical and optical transport properties and the number and type of electronic configurations can be controlled.

The modified material can range from an alloy to various degrees of alloying and modification to one in which only modification and doping actions exist. This provides a new method of synthesizing materials in which modifier atoms can be incorporated at various intervals or layers or a bulk material whose surfaces can be distinctly chemically different from the bulk interior can be made by this process. The apparatus can include metal spinning apparati such as reservoirs, nozzles and the wheel for carrying out the method.

75 Claims, 7 Drawing Figures

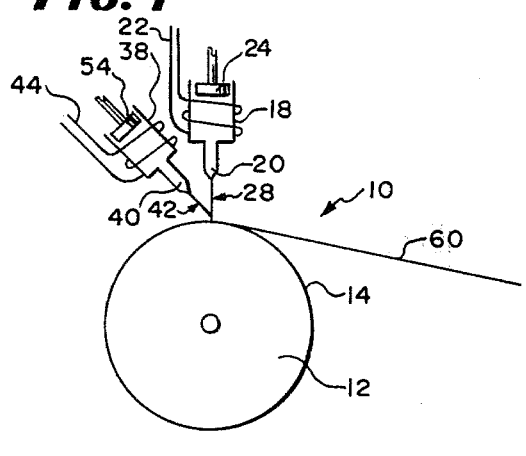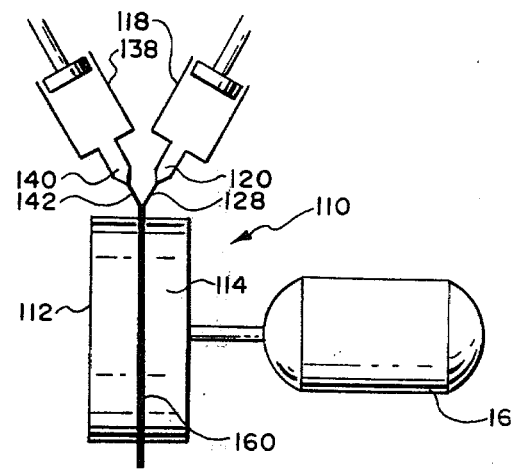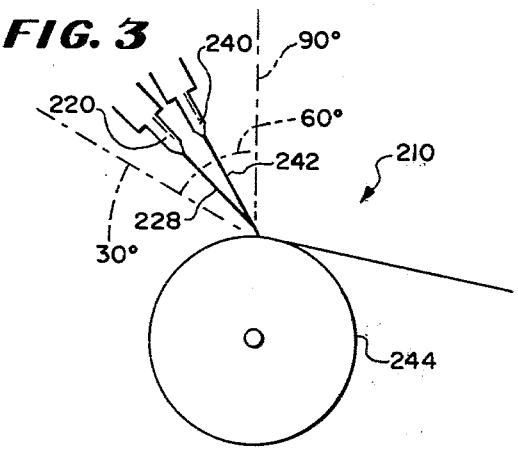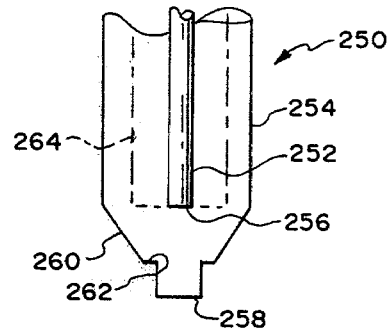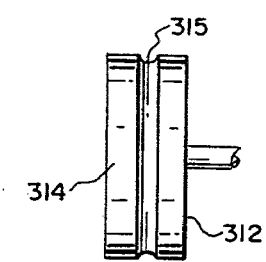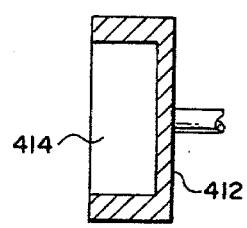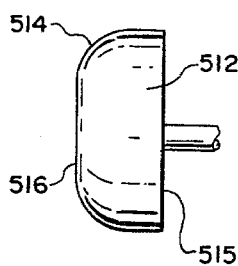

METHOD AND APPARATUS FOR MAKING A MODIFIED AMORPHOUS GLASS MATERIAL

BACKGROUND OF THE INVENTION

1. Field of the Invention

The present invention relates to a method and apparatus for making a modified amorphous glass material which is either a metallic, dielectric or a semiconductor glass material.

2. Description of the Prior Art

Heretofore, it has been known to make metallic glass materials with a technique that is referred to as metal spinning. In practicing such technique, a movable substrate, i.e., a rotating wheel, made of a highly conductive metal is positioned beneath a nozzle at the outlet of a reservoir of liquid metal or metal alloy. The wheel, because of its mass and because of the significant difference in temperature between the molten metal and the ambient temperature of the wheel, need not be cooled in order to provide a cold moving substrate relative to the molten metal. The wheel is typically between 6" and 10" (15.24 and 25.40 centimeters) in diameter and is rotated at a rotational velocity of between 1,000 and 5,000 rpm thereby to obtain a linear velocity, at the point of contact of the metal with the cylindrical periphery of the wheel, of 32.81 to 65.62 feet per second (1,000–2,000 centimeters per second).

Upon contacting the wheel, the molten metal is cooled at a quenching rate of $10^4$ to $10^{8°}$ C. per second and comes off the wheel in a ribbon of metallic amorphous glass. Such amorphous metal glass material has been found to have a number of unique properties such as better ductility and elasticity and the ability of the material to handle reverses in magnetic field with much lower losses than obtained with crystalline materials.

Further information on making amorphous metal glasses can be found in the following articles and book:

"On the uniformity of amorphous metal ribbon formed by a cylindrical jet impinging on a flat moving substrate" by T. R. Anthony and H. E. Cline, *Journal of Applied Physics*, February 1978, page 829;

"Metallic Glasses" by Praveen Chaudhari, Bill C. Giessen and David Turnbull, p. 98, Vol. 242, No. 4, *Scientific American*, April 1980;

"Metallic Glasses" by John J. Gilman, *Science*, p. 856, Vol. 208, May, 1980; and

*Metallic Glasses* published by the American Society for Metals, 1976, Meadowpark, Ohio 44073.

It has also heretofore been proposed to make amorphous semiconductor materials such as by vacuum deposition, e.g., sputtering, vapor deposition, or glow-discharge, etc. Further, it has been proposed to make a modified amorphous semiconductor material which has a modifier material therein for providing to so-called modified amorphous semiconductor material in which the electrical conductivity and other desired parameters can be controlled. Examples of such methods for making a modified or unmodified amorphous semiconductor material are disclosed in: U.S. Pat. No. 4,177,473 issued to S. R. Ovshinsky for: AMORPHOUS SEMICONDUCTOR MEMBER AND METHOD OF MAKING THE SAME; U.S. Pat. No. 4,177,474 issued to S. R. Ovshinsky for: HIGH TEMPERATURE AMORPHOUS SEMICONDUCTOR MEMBER AND METHOD OF MAKING THE SAME; and U.S. Pat. No. 4,178,415 issued to S. R. Ovshinsky and K. Sapru for: MODIFIED AMORPHOUS SEMICONDUCTORS AND METHOD OF MAKING THE SAME.

As will be explained in greater detail hereinafter, the method and apparatus of the present invention differ from the teachings of the prior art by providing a modifying element(s) which can be introduced into the amorphous matrix so that it can enter the matrix with its own independent, separately controllable, quench rate. Thus the modifying element(s) can be frozen into the matrix so as not only to enter the primary bonding of the material to become part of the alloy, but most importantly to be frozen into the alloy in a non-equilibrium manner. This essentially duplicates the film making processes described in the above patents, so that the material parameters of the solid bulk material alloy are relatively independently controllable; i.e., in alloy materials with a substantial band gap, an electrical activation relatively independent of the gap. This expands the unique advantages of the modification processes to material thicknesses substantially greater than so-called films.

Such modifying element(s) can be added by providing relative motion between the matrix and the modifying element(s), such as by providing one or more additional streams such as a second stream of material, directed from a second nozzle, in a metal spinning apparatus, the second nozzle being at the outlet of a reservoir of a fluid modifier material. Such second nozzle is arranged to direct the fluid modifier material toward the substrate in a stream which converges with the stream of metallic or semiconductor host matrix material being directed onto the substrate from a first nozzle at or before the host material makes contact with the substrate. In this way, a modified amorphous metallic or semiconductor glass material is made in which the optical and electrical transport properties of the material formed by the method can be controlled and a controlled number and type of bonding points can be provided in the modified amorphous material.

Further, as will be explained in greater detail hereinafter, the modified amorphous glass materials made according to the teachings of the present invention have different properties that are advantageous. For example, a modified glass material having a large number of bonding points can be utilized for catalytic activity as well as for storing gases, the atoms of which bond to the controlled number and type of bonding points in the material. On the other hand, a modified amorphous semiconductor material in which the optical and electrical transport properties can be controlled can be utilized for various solid state semiconductor devices, for example, thermoelectric devices or devices having other desired properties, such as where the control of the density of states at the Fermi level can effect collector carrier activity.

SUMMARY OF THE INVENTION

According to the invention, there is provided a method and apparatus for making an amorphous modified glass material providing a cooling substrate; forming a host matrix material on said substrate; directing at least one fluid material comprising at least one modifier material in a stream toward said substrate in a direction such that said stream of said at least one modifier material converges with said host matrix material; independently controlling the flow and quench rate of said stream of modifier material; providing for relative movement between said substrate and said stream of modifier material; and maintaining said substrate at a cooling temperature which, in conjunction with said relative movement, flow and quench rate of said modifier material, cools the combined host matrix and modifier materials as they make contact with one another at a quenching rate of from $10^4$ to at least $10^{8°}$ C. or higher per second thereby to form a ribbon of modified amorphous glass material in which the optical and electrical transport properties and the number and type of electronic configurations can be controlled, thereby controlling the orbital relationships between the host matrix material and the modifier material.

By controlling the various properties and configurations of the modified material, the electrical, chemical, thermal or physical characteristics of the material are independently controllable. The independent control of the material characteristics, such as the three dimensional bonding and anti-bonding relationships and positions are not normally seen in crystalline materials, at least not in large and controllable numbers. This is especially true for a d band or multiple orbital modifier element. The d band or multiple orbital modifier elements enable the modified materials to have stable, but non-equilibrium orbital configurations frozen in by the independently controllable quench rate.

In a melting process the relationship and cooling rate of the matrix and added element would allow the added element to be incorporated in the normal matrix structural bonds. In the processes of the invention they become modification elements as described in the above patents. The timing of the introduction of the modifier element(s) can be controlled independently of any crystalline constraints. The flow rate of the modifier element can be controlled and may be varied or intermittent and may incorporate gaseous modifier element(s) in the stream or environment. By independently controlling the environment, quench and flow rates and timing a new bulk material or alloy can be formed with the desired properties, which does not have a counterpart in crystalline materials.

Also, in one preferred embodiment of the invention, said host matrix material and said modifier material are directed toward said substrate through first and second nozzles each of which is positioned to direct fluid material at said substrate at an angle between 90° and 30° to said substrate and one of said nozzles is positioned behind the other of said nozzles such that both nozzles are in substantially the same vertical plane, and such that said streams from said nozzles converge in said vertical plane.

Moreover, in another preferred embodiment, said host matrix material and said modifier material are directed toward said substrate through first and second nozzles each of which is positioned to direct fluid material at said substrate at an angle between 90° and 30° to said substrate and said nozzles are laterally spaced apart and inclined toward each other such that the streams emitting therefrom converge in a plane which extends laterally of the direction of relative movement and which is at an angle of between 30° and 90° to the horizontal.

Still further, in another preferred embodiment, said host matrix material and said modifier material are directed toward said substrate through first and second concentric nozzles which are arranged so that said streams of material emitting therefrom converge with each other at or before contact thereof with said substrate and said concentric nozzles are positioned to direct fluid material at said substrate at an angle between 90° and 30° to a line on said substrate extending in the direction of relative movement.

BRIEF DESCRIPTION OF THE DRAWINGS

FIG. 1 is a side elevational view of one embodiment of the apparatus of the present invention including first and second nozzles, one behind the other, for directing a fluid host matrix material and a fluid modifier material onto a tangent of a rotating substrate.

FIG. 2 is a front elevational view of another embodiment of the apparatus of the present invention where the first and second nozzles of the apparatus are laterally spaced apart.

FIG. 3 is a side elevational view of another embodiment of the apparatus of the present invention similar to FIG. 1 and showing both nozzles inclined to the tangent, and showing the range of angular positions of the nozzles.

FIG. 4 is a sectional elevational view of another embodiment of concentric first and second nozzles utilized in the method and apparatus of the present invention.

FIG. 5 is a front elevational view of one embodiment of the rotating substrate which is in the form of a wheel with an annular groove therein into which streams of host and modifier fluid material are directed.

FIG. 6 is a vertical sectional view of another embodiment of the rotating substrate which is in the form of a cylindrical drum having an inwardly facing cylindrical substrate surface.

FIG. 7 is a vertical elevational view of still another embodiment of the rotating substrate which is in the form of a wheel having a beveled surface.

DESCRIPTION OF THE PREFERRED EMBODIMENTS

Referring now to the drawings in greater detail, there is illustrated in FIG. 1 a metal spinning apparatus 10 constructed in accordance with the teachings of the present invention. The metal spinning apparatus 10 includes a wheel 12 which forms a movable, that is to say, rotatable, substrate having a substrate surface 14. The wheel 12 is rotated by a prime mover such as by the prime mover 16 shown in FIG. 2.

The metal spinning apparatus 10 can include a first generally cylindrical reservoir 18 which is positioned above the wheel 12 and which has a nozzle 20 forming a bottom outlet from the reservoir 18. The reservoir 18 is adapted to receive and hold therein a fluid host metallic or semiconductor matrix material.

In the illustrated embodiment, a coil 22 is situated around the reservoir 18 for heating granular particles of the host matrix material in the reservoir above its melting point so that it is converted into a fluid host matrix material. Also, at the upper end of the reservoir 18 is a piston 24 which can have a heavy mass bearing thereon so as to provide a pressure force by gravity on the fluid host matrix material in the reservoir 18. Alternatively, pressure can be applied on the piston 24 by a pneumatic or hydraulic piston and cylinder mechanism or by an electric screw drive mechanism so that a relatively constant pressure is applied to the fluid host matrix material in the reservoir 18 to cause the same to exit from the nozzle 20 in a stream 28 as shown in FIG. 1.

As shown, the nozzle 20 is situated so as to direct the stream 28 toward the substrate wheel 12 at an angle of approximately 90° to a tangent on the wheel substrate surface 14. This angle can be varied through a range of 60° from 30° to 90°.

In accordance with the teachings of the present invention, the metal spinning apparatus 10 further includes a second reservoir 38 having a fluid host modifier material therein. The reservoir 38 has a bottom outlet nozzle 40 which is arranged to direct a stream 42 of fluid modifier material toward the stream 28 such that it converges with the stream 28 on the substrate or before the stream 28 of host matrix material makes contact with the substrate surface 14 of the wheel 12.

Like the reservoir 18, the reservoir 38 is generally cylindrical and has a coil 44 therearound for heating granular modifier material which has been placed in the reservoir. In other words, by passing a current through the coils 22 and 44, the host and modifier materials are heated by electromagnetic energy above their melting points thereby to provide fluid host and modifier material. Of course, it is to be understood that other means besides the coils 22 and 44 can be provided for heating the granular host matrix and modifier materials received in the respective reservoirs 18 and 38.

Like the reservoir 18, the reservoir 38 also has a piston 54 at the upper end thereof which, by means of a weight placed thereon and gravity, or by means of a pneumatic or hydraulic piston and cylinder mechanism or by means of an electromechanical screw drive, can place pressure on the fluid modifier material in the reservoir 38 to cause the same to come out under pressure in the stream 42 arranged to converge with the stream 28 of fluid host matrix material.

As shown, the nozzle 40 is positioned behind the nozzle 20 and at an angle of approximately 45° to a horizontal tangent of the substrate wheel surface 14. Again, the position of the nozzle 40 can be varied between 30° and 90° and the nozzle 40 can be placed in front of or behind the nozzle 20.

The wheel 12 can be made of a highly conductive material such as copper or aluminum and typically has a diameter of between five and ten inches (13 and 25 centimeters). Alternately, the movable substrate, such as the wheel 12, can be made from or have a coating of other materials which can be interactive or non-interactive. The quench rate can be controlled by thermal conductivity or by refrigeration. A coating or thin film of material on the substrate surface can be of a specified nature and if desired can be partially incorporated in the resulting modified alloy ribbon, such as a dopant or other modifier element.

In practicing one method of the present invention utilizing the metal spinning apparatus 10, the wheel 12 is rotated at a speed of between 1,000 and 5,000 rpm, preferably between 2,000 and 3,000 rpm, so as to establish a linear velocity of between 1,000 and 2,000 centimeters per second at the tangent substrate surface where the streams 28 and 42 make contact with the substrate surface 14 of the wheel 12.

Also, sufficient pressure is provided by the pressure-applying pistons 24 and 54 so that the streams 28 and 42 of fluid host matrix material and fluid modifier material exit the nozzles 20 and 40 at a velocity of between 200 and 300 centimeters per second. Also, typically, the outlet orifice of each of the nozzles 20 and 40 has a diameter of between 0.005 and 0.15 centimeters or more. Each of the flow rates is independently controllable.

To minimize, if not altogether obviate, contamination of the host and modifier materials or the material formed therefrom, the apparatus is surrounded by an inert gas, when desired e.g., argon, neon, helium, krypton or xenon and the method is practiced under pressures ranging from a vacuum to 58 psi absolute. Also, where desired, the environment and/or the streams can contain one or more active gases which are incorporated in the alloy ribbon, such as oxygen, nitrogen, silicon tetrafluoride or arsine.

As stated above, the streams 28 and 42 are aligned so that they converge after or before they make contact with the substrate surface 14. Then, when the streams 28 and 42 make contact with the substrate surface 14, the temperature differential between the temperature of the wheel 12 and the temperatures of each of the streams 28 and 42, in conjunction with the linear velocity of the substrate surface 14 at the tangent, is such that the combined stream is quenched at a quenching rate of from $10^{4°}$ to at least $10^{8°}$ C. per second or more. To achieve this quenching rate, the temperature of the wheel 12 is maintained between 4.2° K. and ambient room temperature. Ambient room temperature will often provide a sufficient quenching rate because of the temperature differential between the temperature of the substrate surface 14 and the temperatures of the streams 28 and 42 and because of the high linear velocity at the tangent point of contact on the substrate wheel surface 14. Of course, the lower the temperature of the wheel 12, the higher the quenching rate.

As a result of quenching, the streams 28 and 42 of fluid host matrix materials and fluid modifier material at a high quenching rate of from $10^{4°}$ to at least $10^{8°}$ C. per second or more, a ribbon of modified amorphous glass material 60 is produced which comes off the wheel 12 as shown in FIG. 1. The width of this ribbon can, of course, be varied depending upon the size of the outlet orifices of the nozzles 20 and 40.

From present studies, it appears that each of the nozzle orifices can have a substantial length colinear with the axis of rotation of the wheel 12 and with a width between 0.005 and 0.15 centimeters or more thereby to form fluid sheet-like streams which can converge after or before making contact with the substrate surface 14. In this way, a wider ribbon of modified amorphous material can be made with the method and apparatus 10 of the present invention.

In the embodiment illustrated in FIG. 1, however, the nozzles 20 and 40 generally are located in a vertical plane which is colinear with the rotational direction of movement of the wheel 14.

The method and apparatus 10 can be used for making an amorphous modified metal or an amorphous modified semiconductor.

In practicing the method of the present invention utilizing the apparatus 10 for making an amorphous modified metal, the fluid host matrix material in the reservoir 18 can be a metal or metal alloy which is modified by a metal, semiconductor or metal alloy in the reservoir 38. The modifier is typically a significant percentage, such as, for example, 0.5% to 30% (atomic percent) in the resulting ribbon 60 of modified amorphous material. As in the above patents, even smaller amounts of modifier elements could be utilized to alter the electrical conductivity through compensation or doping. See also, U.S. Pat. No. 4,217,374, Amorphous Semiconductors Equivalent to Crystalline Semiconducotrs, Stanford R. Ovshinsky and Masatsugu Izu and U.S. Pat. No. 4,226,898, Amorphous Semiconductors Equivalent to Crystalline Semiconductors, Stanford R.

Ovshinsky and Arun Madan. Small amounts of materials can be utilized with silicon created in a bulk form while in a reactive plasma of fluorine and/or hydrogen. The modifier element can be an arsenic compound in which only parts per million (ppm) would be required to dope the bulk material.

By quenching the modified molten metal or molten metallic alloy, at a quenching rate of $10^{4°}$ to $10^{8°}$ C. per second or more, a modified amorphous metallic glass ribbon 60 is attained which, because it has been frozen in the amorphous as opposed to the crystalline state, and which is modified, will have a significant number of disassocation points for molecules and bonding points, i.e., high valence atoms with many unfilled or unconnected valence positions, which provide bonding points for free atoms of a gas so that the material has utility in storing gases and which can provide a material that can simulate the catalytic chemical properties of a noble metal without including any noble metal.

Also in practicing the method of the present invention, the fluid host matrix material can be a semiconductor material such as, for example, silicon; silicon oxide; carbon; silicon and nitrogen; boron and carbon; boron and nitrogen; silicon and nitrogen; tellurium, selenium and germanium; or, tellurium, selenium, germanium and arsenic, which is modified by a semiconductor or metal material.

In the production of one modified semiconductor glass material, the host matrix material is silicon oxide where the silicon to oxygen ratio is represented by $SiO_x$ where x can be controlled from 0 to 2 and the modifier is an alkali metal such as lithium which can be, for example, from 0.5 to 30% (atomic percent).

Further, in practicing the method of the present invention, the modifier material can be a semiconductor or a metal, for example, a transition metal, e.g. tungsten, or a rare earth metal and other elements which can provide the properties described in the above referenced patents and application, such as multivalance and multiorbital elements.

One of the advantages of the present invention is the fact that a glass material can be made as opposed to a so-called thin film material. In this respect, modified amorphous semiconductor thin film materials and methods for making them having the compositions referred to above, are disclosed in: U.S. Pat. No. 4,177,473 issued to S. R. Ovshinsky for: AMORPHOUS SEMICONDUCTOR MEMBER AND METHOD OF MAKING THE SAME; U.S. Pat. No. 4,177,474 issued to S. R. Ovshinsky for: HIGH TEMPERATURE AMORPHOUS SEMICONDUCTOR MEMBER AND METHOD OF MAKING THE SAME; and U.S. Pat. No. 4,178,415 issued to S. R. Ovshinsky and K. Sapru for: MODIFIED AMORPHOUS SEMICONDUCTORS AND METHOD OF MAKING THE SAME; the disclosures of which are incorporated herein by reference.

Such thin film materials typically have been made using vacuum deposition techniques such as sputtering, vapor deposition or glow-discharge.

A specific advantage of the method and apparatus 10 of the present invention is that by utilizing metal spinning techniques, one can, according to the teachings of the present invention, make a modified amorphous metal or metallic glass material or a modified amorphous semiconductor glass material and thereby make larger quantities of the material than presently available, utilizing so-called thin film-making techniques. In this way, relatively large amounts of modified amorphous glass materials can be formed in which the optical and electrical transport properties and chemical properties of the material can be controlled and in which a controlled number and type of electronic configurations can be controlled. The specific reactivity or non-reactivity can be designed, such as where chemical inertness is required.

Referring now to FIG. 2, there is illustrated therein another embodiment of a metal spinning apparatus made according to the teachings of the present invention and generally identified by the reference numeral 110. The metal spinning apparatus 110 includes a wheel 112 which has a smooth cylindrical substrate surface 114 thereon and which is driven by the prime mover 16. In this embodiment, a reservoir 118 for a fluid host matrix material is positioned, as shown, on one side of a tangent to the surface 114, with an outlet nozzle 120 therefrom directing a stream 128 of host matrix material, at a lateral angle to, and including a tangent to the substrate surface 114. In this embodiment, instead of being positioned in a vertical plane which is colinear with the direction of rotation of the wheel 112, the nozzle 120 is in a plane which is at an angle of roughly 60° to a plane of rotation of the wheel 112.

Also in this embodiment, there is provided a reservoir 138, similar to the reservoir 38 shown in FIG. 1, for holding a fluid modifier material. The reservoir 138 has a nozzle 140 which is positioned on the other side of the tangent and is arranged to direct a stream 142 of fluid modifier material in a direction such that it will converge with the stream 128 of fluid host matrix material after or before the stream of host matrix material makes contact with the substrate surface 114. The nozzle 140 is also positioned so that the stream 142 emitting therefrom lies in a plane which is approximately 60° to a plane of rotation of the substrate surface 114.

Thus, as shown, the nozzles 120 and 140 are laterally spaced apart and do not lie in a vertical plane one behind the other as in the metal spinning apparatus 10 shown in FIG. 1. Rather, the nozzles 120 and 140 are positioned at a lateral angle of 30° to 80° to a tangent and an angle of 90° to 30° with respect to the linear direction of movement at the tangent and with respect to a horizontal plane containing such tangent. Thus, looking at the nozzles 120 and 140 from a side of the wheel 112, they will be in line and positioned at an angle between 90° and 30° to a tangent of the wheel. When looking at the wheels from a direction normal to the axis of rotation, they are inclined from a plane containing a tangent and a ribbon of glass material 160 coming off the substrate surface 114.

In FIG. 3, there is illustrated a portion of another embodiment of the metal spinning apparatus of the present invention generally identified by the reference numeral 210. In this embodiment, a nozzle 220 from a reservoir of host material is at an angle of 45° to a tangent and is positioned behind a nozzle 240 extending from a reservoir of modifier material which is positioned at an angle of 60° such that converging streams 228 and 242 of fluid host matrix material and fluid modifier material emanating therefrom make contact with a rotating substrate surface 244 at a slightly acute angle to the tangent and to the linear direction of movement of the substrate surface 244 at the tangent.

Also, it will be apparent from FIG. 3 that the position of the nozzles of host matrix material and modifier material can be alternated, with either one behind the other and with each nozzle being positioned within a 60° arc from 90° to the tangent to 30° to the tangent.

Referring now to FIG. 4, there is illustrated therein another nozzle arrangement 250 comprising a first inner nozzle 252 and a concentric outer annular nozzle 254. As shown, a lower outlet orifice 256 of the nozzle 252 is positioned to open within the outer nozzle 254 above an outlet orifice 258 therefrom. The nozzle 254 has a frusto-conical section 260 for causing fluid material therein to converge and mix with the fluid material exiting from the outlet orifice 256 which opens into the frusto-conical section 260.

Also in this embodiment an annular shoulder formation 262 is provided at the bottom of the frusto-conical section 260 and above the outlet orifice 258 thereby to cause some turbulence and better mixing of the fluid materials.

In this embodiment, the fluid modifier material is in the inner nozzle 252 and the fluid host matrix material is in the outer annular nozzle 254. However, the diameters of the nozzles 252 and 254 can be varied so that the modifier material is carried in the annular nozzle 254 and the host material is carried in the inner nozzle 252.

Also, if desired, a third concentric nozzle 264 can be provided between the first nozzle 252 and the second nozzle 254. This third nozzle 264 (and even other additional nozzles) can be used for adding other materials such as, for example, another modifier, alloy or dopant to the host matrix material.

As in the previous embodiment, the nozzles 252 and 254 are arranged so that the streams of material emitting therefrom converge with each other at or before contact with the substrate and are positioned to direct fluid materials at the substrate at an angle between 90° and 30° to a line on the substrate extending in the direction of relative movement.

From this embodiment, it will be appreciated that an additional nozzle or nozzles can be added to the apparatus 10, 110 or 210, if desired.

The rotating substrate surface can take various forms and in FIG. 5, there is illustrated a wheel 312 having a rotating substrate surface 314 which has an annular groove 315 therein into which the streams of host and modifier material are directed. The annular groove 315 has a semi-elliptical or semi-cylindrical cross section such that the ribbon of glass material coming off the wheel 314 has a generally eliptical cross section.

In FIG. 6, there is illustrated a drum-shaped wheel 412 which has an inner cylindrical substrate-forming surface 414 onto which the combined streams of fluid host matrix material and fluid modifying material are directed.

Further in FIG. 7, there is illustrated a wheel 512 which has a bevel substrate surface 514 which is a curved surface extending from a largest diameter 515 on one side of the wheel 512 to a smallest diameter 516 of the wheel 512 on the other side thereof.

The configuration of the moving substrate surface on the wheel or drum utilized in the metal spinning apparatus 10, 110 or 210 can be varied as shown in FIGS. 5, 6 and 7 and can take other shapes and dimensions not shown herein. For example, a much wider cylindrical substrate surface 14 can be provided when the outlet orifices of the outlet nozzles 20 and 40 for fluid host matrix material and fluid modifier material have a much greater length in a direction parallel to the axis of rotation of the wheel 12 and with the outer nozzle(s) surrounding the inner nozzle, i.e. coxial/adjacent nozzles to obtain a wide ribbon of modified amorphous glass material as described above. Also a planar substrate could be provided with the substrate and/or nozzles indexed to provide relative motion.

From the foregoing description, it will be apparent that the method and apparatus 10, 110 or 210 and/or modified embodiments thereof of the present invention provide a number of advantages, some of which have been described above and others of which are inherent in the invention. Specifically, the invention provides a method and apparatus for making modified amorphous metallic or semiconductor glass materials. Also, many modifications can be made to the method and apparatus of the present invention without departing from the teachings of the invention. Accordingly, the scope of the invention is only to be limited by or necessitated by the following claims.

We claim:

1. A method for making an amorphous modified glass material, comprising the steps of: providing a cooling substrate; forming a host matrix material on said substrate; directing at least one fluid material including at least one modifier material in a stream toward said substrate in a direction such that said stream of said at least one modifier material converges with said host matrix material; independently controlling the flow and quench rates of said stream; providing for relative movement between said substrate and said stream of modifier material; and maintaining said substrate at a cooling temperature which, in conjunction with said relative movement, flow and quench rate of said modifier material cools the combined host matrix and modifier materials as they make contact with one another at a quenching rate of from $10^{4°}$ to at least $10^{8°}$ C. per second or more thereby to form a ribbon of modified amorphous glass material in which the optical and electrical transport properties and the number and type of electronic configurations can be controlled, thereby controlling the orbital relationships between said host matrix material and said modifier material.

2. The method according to claim 1 wherein said host matrix material and said stream of modifier material are combined after or before said host matrix material is formed on said substrate.

3. The method according to claim 1 wherein said substrate is a wheel which is rotated.

4. The method according to claim 3 wherein said wheel is rotated at a speed of 1000 to 5000 rpm.

5. The method according to claim 2 wherein said host matrix material is formed on said substrate from a fluid material expelled through a nozzle.

6. A method according to claim 5 wherein said host matrix material is directed under pressure through said nozzle at the substrate.

7. The method according to claim 6 wherein said nozzle has an orifice of from 0.005 to 0.15 centimeters or more in diameter.

8. The method according to claim 1 wherein said modifier material is directed toward said substrate through a nozzle.

9. The method according to claim 8 wherein said modifier material is directed under pressure toward said substrate.

10. The method according to claim 9 wherein the orifice of said nozzle for directing said modifier material at said substrate has a diameter of from 0.005 to 0.15 centimeters or more.

11. The method according to claim 1 wherein said modifier material is a metallic material.

12. The method according to claim 1 wherein said host matrix material is a metallic material.

13. The method according to claim 1 wherein said host matrix material is a semiconductor material.

14. The method according to claim 2 wherein said host matrix material and said modifier material are directed toward said substrate through first and second nozzles each of which is positioned to direct fluid material at said substrate at an angle between 90° and 30° to said substrate.

15. The method according to claim 14 wherein one of said nozzles is positioned behind the other of said nozzles such that both nozzles are in substantially the same vertical plane, and such that said streams from said nozzles converge in said vertical plane.

16. The method according to claim 15 wherein said vertical plane is colinear with the direction of movement of said substrate.

17. The method according to claim 14 wherein said nozzles are laterally spaced apart and inclined toward each other such that the streams emitting therefrom converge in a plane which extends laterally of the direction of relative movement and which is at an angle of between 30° and 90° to the horizontal.

18. The method according to claim 2 wherein said substrate is a wheel and said host matrix material and said modifier material are directed toward a tangent of said wheel through first and second nozzles which direct fluid material at said wheel in streams at an angle of between 30° and 90° to the tangent.

19. The method according to claim 18 wherein said wheel has a smooth outer cylindrical periphery onto which said converging streams are directed.

20. The method according to claim 18 wherein said wheel has a drum shape with an inwardly facing cylindrical surface onto which said converging streams are directed.

21. The method according to claim 18 wherein said wheel has an annular groove in the outer cylindrical surface thereof, into which groove said converging streams are directed.

22. The method according to claim 18 wherein said wheel has a beveled surface extending axially of the wheel from a largest diameter thereof on one side of said wheel to a smallest diameter thereof on the other side of said wheel.

23. The method according to claim 1 wherein said substrate is a wheel having a diameter between 5" and 10" (12.70 and 25.40 centimeters) and being made of a highly conductive metallic material.

24. The method according to claim 1 including the step of performing the method within a controlled atmosphere.

25. The method according to claim 24 wherein said controlled atmosphere includes a reactive gas to be at least partially incorporated in the host matrix material.

26. The method according to claim 24 wherein said controlled atmosphere is an inert gas.

27. The method according to claim 5 wherein said substrate is movable and has a surface velocity of between 1000 and 4000 centimeters per second at the point where the stream of fluid host matrix material and fluid modifier material make contract with said substrate.

28. The method according to claim 5 wherein said stream of fluid host matrix material is directed from a nozzle at the outlet of a reservoir of said host matrix material under pressure such that said stream from said nozzle has a velocity between 200 and 300 centimeters per second.

29. The method according to claim 1 wherein said stream of fluid modifier material is directed from a nozzle at the outlet of a reservoir of said fluid modifier material under pressure such that said stream from said nozzle has a velocity between 200 and 300 centimeters per second.

30. The method according to claim 1 wherein said host matrix material is one of a molten metallic or molten semiconductor material.

31. The method according to claim 1 where said fluid modifier material is molten metallic material.

32. The method according to claim 1 wherein said host matrix material is one transition metal and said modifier material is another.

33. The method according to claim 5 wherein said fluid host matrix material and said fluid modifier material are directed toward said substrate through first and second concentric nozzles which are arranged so that said streams of material emitting therefrom converge with each other as or before contact thereof with said substrate.

34. The method according to claim 33 wherein said concentric nozzles are positioned to direct fluid material at said substrate at an angle between 90° and 30° to a line on said substrate extending in the direction of relative movement.

35. The method according to claim 34 including the step of directing through a third concentric nozzle a third stream of additional material, such as, a modifier, alloy or dopant material, toward said stream of host matrix material such that said streams of material converge and combine as or before contact thereof with said substrate.

36. The method according to claim 5 including the step of directing a third stream of additional material, such as, a modifier, alloy or dopant material, toward said stream of host matrix material such that said streams converge and combine at or before contact thereof with said substrate.

37. The method according to claim 1 wherein said modifier material is a molten semiconductor.

38. The method according to claim 25 wherein said controlled atmosphere is maintained at a pressure from a vacuum to 58 psi or more.

39. Apparatus for making an amorphous modified glass material, comprising a cooling substrate; means for forming a host matrix material on said substrate; means for directing at least one fluid material including at least one modifier material in a stream toward said substrate in a direction such that said stream of said at least one modifier material converges with said host matrix material; means for independently controlling the flow and quench rates of said stream; means for causing relative movement between said substrate and said stream of modifier material; and means for maintaining said substrate at a cooling temperature which, in conjunction with said relative movement, flow and quench rates of said modifier material, is capable of cooling the combined host matrix and modifier materials as they make contact with one another at a quenching rate of from $10^4$ to at least $10^{8°}$ C. per second or more so that a ribbon of modified amorphous glass material is formed in which the optical and electrical transport properties and the number and type of electronic configurations can be controlled.

40. The apparatus according to claim 39 wherein said substrate is a wheel which is rotated.

41. The apparatus according to claim 39 including means for combining said host matrix material and said stream of modifier material after or before said host matrix material is formed on said substrate.

42. The apparatus according to claim 40 wherein said means for causing movement of said wheel is capable of rotating said wheel at a speed of 1000 to 5000 rpm.

43. The apparatus according to claim 39 wherein said host matrix material is a fluid material and said means for forming said host matrix material on said substrate includes a reservoir with an outlet nozzle directing said material at said substrate.

44. The apparatus according to claim 43 wherein said means for forming said host matrix material on said substrate includes means for applying pressure on said fluid material in said reservoir.

45. The apparatus according to claim 44 wherein said outlet nozzle has an orifice of from 0.005 to 0.15 centimeters or more in diameter.

46. The apparatus according to claim 39 wherein said means for directing said modifier material toward said substrate includes a reservoir with an outlet nozzle.

47. The apparatus according to claim 46 wherein said means for directing said modifier material toward said substrate includes means for applying pressure on said fluid modifier in said reservoir.

48. The apparatus according to claim 47 wherein said nozzle for directing said modifier material toward said substrate has an orifice diameter of from 0.005 to 0.15 centimeters or more.

49. The apparatus according to claim 39 wherein said means for directing at least one fluid material is capable of directing a metallic modifier material.

50. The apparatus according to claim 39 wherein said means for forming a host matrix material is capable of forming a semiconductor material.

51. The apparatus according to claim 43 wherein said means for forming said host matrix material and said means for directing said modifier material toward said substrate comprise first and second nozzles each of which is positioned to direct fluid material at said substrate at an angle between 90° and 30° to said substrate.

52. The apparatus according to claim 51 wherein one of said nozzles is positioned behind the other of said nozzles such that both nozzles are in substantially the same vertical plane and such that said streams form said nozzles converge in said vertical plane.

53. The apparatus according to claim 52 wherein said vertical plane is colinear with the direction of movement of said substrate.

54. The apparatus according to claim 51 wherein said nozzles are laterally spaced apart and inclined toward each other such that the streams emitting therefrom converge in a plane which extends laterally of the direction of relative movement and which is at an angle of between 30° and 90° to the horizontal.

55. The apparatus according to claim 43 wherein said substrate is a wheel and said means for forming said host matrix material and said means for directing said modifier material comprise first and second nozzles which direct fluid material at said wheel in separate converging streams at an angle of between 30° and 90° to a tangent of said wheel.

56. The apparatus according to claim 55 wherein said wheel has a smooth outer cylindrical periphery onto which said converging streams are directed.

57. The apparatus according to claim 55 wherein said wheel has a drum shape with an inwardly facing cylindrical surface onto which said converging streams are directed.

58. The apparatus according to claim 55 wherein said wheel has an annular groove in the outer cylindrical surface thereof, into which groove said converging streams are directed.

59. The apparatus according to claim 55 wherein said wheel has a beveled surface extending axially of the wheel from a largest diameter thereof on one side of said wheel to a smallest diameter thereof on the other side of said wheel.

60. The apparatus according to claim 39 wherein said substrate is a wheel having a diameter between 5" and 10" (12.70 and 25.40 centimeters) and being made of a highly conductive metallic material.

61. The apparatus according to claim 39 including means for controlling the atmosphere surrounding said substrate.

62. The apparatus according to claim 61 wherein said means for controlling the atmosphere is capable of introducing a reactive gas to be at least partially incorporated in said host matrix material.

63. The apparatus according to claim 61 wherein the means for controlling the atmosphere is capable of introducing an inert gas.

64. The apparatus according to claim 43 wherein said means for causing movement is capable of moving said substrate such that it has a surface velocity of between 1000 and 4000 centimeters per second at the point where the streams of fluid host matrix material and fluid modifier material make contact with said substrate.

65. The apparatus according to claim 43 wherein said means for forming said stream of fluid host matrix material at said substrate comprises means for applying pressure to said fluid host matrix material in said reservoir such that said stream from said nozzle has a velocity between 200 and 300 centimeters per second.

66. The apparatus according to claim 39 wherein said means for directing said stream of fluid modifier material toward said substrate comprises a nozzle at the outlet of a reservoir for said fluid modifier material, such that said stream from said nozzle has a velocity between 200 and 300 centimeters per second.

67. The apparatus according to claim 39 wherein said means for forming a host matrix material is capable of forming a molten metallic or a molten semiconductor material.

68. The apparatus according to claim 39 wherein said means for directing at least one fluid material is capable of directing a molten metallic modifier material.

69. The apparatus according to claim 39 wherein said means for forming a host matrix material is capable of forming one transition metal and said said means for directing at least one fluid material is capable of directing another transition metal modifier material.

70. The apparatus according to claim 39 wherein said means for directing at least one fluid material is capable of directing a molten semiconductor material.

71. The apparatus according to claim 43 wherein said means for forming said fluid host matrix material and said means for directing said fluid modifier material toward said substrate comprise first and second concentric nozzles which are arranged so that said streams of material emitting therefrom converge with each other as or before contact thereof with said substrate.

72. The apparatus according to claim 71 wherein said concentric nozzles are positioned to direct fluid material at said substrate at an angle between 90° and 30° to a line on said substrate extending in the direction of relative movement.

73. The apparatus according to claim 72 including means for directing a third stream of additional material, such as, a modifier, alloy or dopant material, toward said host matrix material such that said streams of material converge as or before said streams make contact with said substrate.

74. The apparatus according to claim 55 including means for directing a third stream of additional material, such as, a modifier, alloy or dopant material, toward said host matrix material such that said streams of material converge after or before said streams make contact with said substrate.

75. The apparatus according to claim 61 wherein said means for controlling the atmosphere is capable of maintaining a pressure from a vacuum to 58 psi or more.

* * * * *

UNITED STATES PATENT AND TRADEMARK OFFICE
CERTIFICATE OF CORRECTION

PATENT NO. : 4,339,255
DATED : July 13, 1982
INVENTOR(S) : S. R. Ovshinsky and R. A. Flasck It is certified that error appears in the above—identified patent and that said Letters Patent is hereby corrected as shown below:

Column 1, line 55, "to" should be --a--.
Column 6, line 18, "$10^{4o}$" should be --$10^4$--;
         line 31, "$10^{4o}$" should be --$10^4$--;
         lines 65 and 66, "Semiconducotrs" should be
                                  --Semiconductors--.
Column 7, line 8, "$10^{4o}$" should be --$10^4$--;
         line 13, "disassocation" should be --disassociation--
         line 39, "multivalance" should be --multivalence--.
Column 10, claim 1, line 35, "$10^{4o}$" should be --$10^4$--
          claim 6, line 53, "A" should be --The--.
Column 11, claim 27, line 65, "contract" should be --contact--.
Column 14, claim 69, line 56, "said said" should be --said--.
Column 16, claim 74, line 3, "55" should be --43--.

Signed and Sealed this

Fifth Day of October 198

[SEAL]

Attest:

GERALD J. MOSSINGHOFF

Attesting Officer      Commissioner of Patents and Trademarks